United States Patent
Linde et al.

(10) Patent No.: US 12,384,514 B2
(45) Date of Patent: Aug. 12, 2025

(54) LIGHTWEIGHT STRUCTURE FOR A VEHICLE AND AIRCRAFT

(71) Applicant: Airbus Operations GmbH, Hamburg (DE)

(72) Inventors: Peter Linde, Hamburg (DE); Gunnar Haase, Hamburg (DE); Awista Nasiri, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 620 days.

(21) Appl. No.: 17/832,181

(22) Filed: Jun. 3, 2022

(65) Prior Publication Data

US 2022/0371739 A1 Nov. 24, 2022

Related U.S. Application Data

(63) Continuation of application No. PCT/EP2020/083991, filed on Nov. 30, 2020.

(30) Foreign Application Priority Data

Dec. 5, 2019 (DE) .......................... 102019218979.2

(51) Int. Cl.
*B64D 27/357* (2024.01)
*B60L 50/60* (2019.01)
(Continued)

(52) U.S. Cl.
CPC ............... *B64C 3/18* (2013.01); *B60L 50/64* (2019.02); *B60L 50/66* (2019.02); *B64D 27/31* (2024.01);
(Continued)

(58) Field of Classification Search
CPC . Y02E 60/10; H01M 2220/20; H01M 50/516; H01M 50/514; H01M 50/503;
(Continued)

(56) References Cited

U.S. PATENT DOCUMENTS 8,659,874 B2  2/2014  Shaffer et al.
8,967,529 B1  3/2015  Bennett
(Continued)

FOREIGN PATENT DOCUMENTS

CN   105845445 B  *  6/2018  ............. H01G 11/00
CN   109760819 A  *  5/2019  ............. H01G 11/00
(Continued)

OTHER PUBLICATIONS

German Search Report for Application No. 102019218979 dated Sep. 21, 2021.
(Continued)

*Primary Examiner* — Milton I Cano
*Assistant Examiner* — Jesse J Efymow
(74) *Attorney, Agent, or Firm* — KDW Firm PLLC

(57) ABSTRACT

A lightweight structure for a vehicle or aircraft includes a longitudinal member with a base bridge, having a first collective conductor and a transversal member with a central bridge and transversal bridge with a first connection conductor extending on a first surface of the transversal bridge and on a second surface of the transversal bridge oriented opposite the first surface, and a second connection conductor extending separately from the first connection conductor. The transversal member is connected to the base bridge at the first end section, so the first connection conductor contacts the first collective conductor of the base bridge. The lightweight structure includes a carbon fiber structural battery (CFSB) connected with the central bridge of the transversal member, a first collector of the CFSB electrically connected to the first or second connection conductor and a second collector of the CFSB electrically connected to the other connection conductor.

16 Claims, 4 Drawing Sheets

(51) Int. Cl.
  *B60L 50/64* (2019.01)
  *B64C 3/18* (2006.01)
  *B64D 27/31* (2024.01)
  *B64D 27/34* (2024.01)
  *H01M 10/0585* (2010.01)
  *H01M 50/249* (2021.01)
  *H01M 50/503* (2021.01)

(52) U.S. Cl.
  CPC ............ *B64D 27/34* (2024.01); *B64D 27/357* (2024.01); *H01M 10/0585* (2013.01); *H01M 50/249* (2021.01); *H01M 50/503* (2021.01); *B60L 2200/10* (2013.01); *H01M 2220/20* (2013.01)

(58) Field of Classification Search
  CPC ............ H01M 50/437; H01M 50/249; H01M 50/209; H01M 50/124; H01M 50/121; H01M 50/119; H01M 10/0585; H01M 10/0565; H01M 10/052; H01M 4/663; H01M 4/62; H01M 4/5825; H01M 4/505; B64D 27/357; B64D 27/34; B64D 27/31; B64C 3/18; B60L 2200/10; B60L 50/64; B60L 50/66
  See application file for complete search history.

(56) References Cited

U.S. PATENT DOCUMENTS

| | | |
|---|---|---|
| 9,520,580 B2 | 12/2016 | Sayre et al. |
| 10,167,550 B2* | 1/2019 | Wen ..................... H01B 7/0823 |
| 11,316,224 B2* | 4/2022 | Zimmermann ........ B64D 27/24 |
| 2012/0103685 A1 | 5/2012 | Blanchard et al. |
| 2016/0214735 A1 | 7/2016 | Garcia et al. |
| 2017/0253346 A1 | 9/2017 | Schaaf et al. |
| 2018/0040912 A1* | 2/2018 | Chang ................. H01M 50/126 |
| 2019/0061901 A1* | 2/2019 | Long ......................... B32B 5/26 |
| 2019/0263498 A1 | 8/2019 | Bernasconi et al. |

FOREIGN PATENT DOCUMENTS

| | | |
|---|---|---|
| DE | 10 2015 202 168 A1 | 8/2016 |
| EP | 1 901 387 A2 | 3/2008 |
| EP | 1901387 B1 | 2/2012 |
| EP | 3 544 083 A1 | 9/2019 |

OTHER PUBLICATIONS

International Search Report for Application No. PCT/EP2020/083991 dated Mar. 4, 2021.

* cited by examiner

LIGHTWEIGHT STRUCTURE FOR A VEHICLE AND AIRCRAFT

CROSS-REFERENCE TO RELATED APPLICATIONS

This application is a continuation of and claims priority to Patent Application No. PCT/EP2020/083991 filed Nov. 30, 2020, which claims priority to German Patent Application No. 10 2019 218 979.2 filed Dec. 5, 2019, the entire disclosures of which are incorporated by reference herein.

TECHNICAL FIELD

The disclosure herein relates to a lightweight structure for a vehicle, in particular an aircraft, and also to an aircraft.

BACKGROUND

In vehicle construction, use is increasingly being made of electrical systems. For example electric drives are being installed more and more frequently in order to reduce the emissions of the vehicle. Furthermore, the number of electrically operated systems, for example the number of electric actuators, sensor systems or the like, is generally increasing. In order to be able to meet the demand for electrical energy in the vehicle, high-performance electrical energy stores which can be integrated into the vehicle in a space-saving and weight-saving manner are desired. This applies to road vehicles and particularly to aircraft.

One approach for meeting these requirements is to integrate the energy storage device as a load-bearing part into a structure of the vehicle. By way of example, U.S. Pat. No. 9,520,580 B2 describes a vehicle in which a battery is embedded into a fiber composite component in a load-bearing manner. US 2019/0263498 A1 also describes a light aircraft in which parts of an outer skin of the fuselage or wing are configured as load-bearing structural batteries. U.S. Pat. No. 8,967,529 B1 also describes arranging battery cells into a high-strength container composed of fiber composite panels and arranging the container into cutouts formed in stiffening ribs of a wing of the aircraft.

U.S. Pat. No. 8,659,874 B2, for example, also describes carbon fiber composite batteries which have a cathode layer composed of carbon fibers coated with lithium ions, an anode layer composed of carbon fibers, and a separator layer which is arranged between the anode layer and the cathode layer and which is composed of glass fibers, wherein the cathode layer, the anode layer and the separator layer are each embedded into an electrolytic polymer matrix material.

SUMMARY

One of the objects of the disclosure herein is to integrate an electrical energy storage device into a lightweight structure in a weight-saving and easily installable manner.

This object is achieved by the respective subject matter disclosed herein.

According to a first aspect of the disclosure herein, provision is made of a lightweight structure for a vehicle, in particular for an aircraft. The lightweight structure comprises a first longitudinal member having a base web which has, on a contact surface, a first collecting conductor track composed of an electrically conductive material.

The first longitudinal member may be implemented, for example, in the form of a carrier with a U-shaped cross section, wherein, in addition to a lower base web, a main web extending transversely with respect to the latter and an upper base web extending from the main web parallel to the lower base web are provided. The longitudinal member may be formed, for example, from a fiber composite material, for example a carbon-fiber-reinforced thermoplastic material or the like, or from a metal material, for example from an aluminum alloy or the like. The collecting conductor track extends on a contact surface of the base web, which contact surface may, for example, face toward the optional upper base web, and is firmly connected thereto. It is for example possible for the collecting conductor track to be adhesively bonded or printed onto the contact surface.

The lightweight structure also has a transverse member having a central web and a transverse web extending transversely with respect to the central web. The transverse web comprises a first connecting conductor track composed of an electrically conductive material which extends in the region of a first end portion of the transverse member on a first surface and a second surface, which is oriented opposite to the first surface, of the transverse web, and a second connecting conductor track composed of an electrically conductive material which extends separately from the first connecting conductor track at least on the first surface of the transverse web. The transverse member extends transversely with respect to the longitudinal member and the transverse web of the transverse member is connected, at the first end portion, to the base web of the first longitudinal member in such a way that the first connecting conductor track is in contact with the collecting conductor track of the base web of the first longitudinal member.

The transverse member may have, for example, a T-shaped, a Z-shaped or an H-shaped cross section which is defined by the central web, the transverse web and optionally by a further transverse web. The transverse member may be formed, for example, from a fiber composite material, for example a carbon-fiber-reinforced thermoplastic material or the like, or from a metal material, for example from an aluminum alloy or the like. The first connecting conductor track extends in the first end portion of the transverse member in a continuous manner on a first surface of the transverse web, the first surface being oriented so as to face away from the contact surface of the base web of the longitudinal member, and on a second surface of the transverse web, the second surface being oriented so as to face toward the contact surface of the base web of the longitudinal member. For example, the first connecting conductor track may run on an edge of the transverse web connecting the first and the second surface or through a through-hole connecting the first and the second surface. The second connecting conductor track runs separately or spaced apart from the first connecting conductor track on the first surface of the transverse web of the transverse member and may optionally also extend on the second surface of the transverse web. The connecting conductor tracks are firmly connected to the first and/or the second surface of the transverse web, for example by being adhesively bonded or printed onto the first and/or the second surface. The transverse member and the first longitudinal member form a T-shaped connection, one end of the transverse member being mechanically connected to the longitudinal member, for example screwed, riveted, adhesively bonded or welded thereto or connected thereto in some other way. In particular, the transverse web of the transverse member and the base web of the longitudinal member are arranged so as to overlap, the second surface of the transverse web facing toward the contact surface of the base web and the first collecting conductor track of the base web being in direct and thus electrically conducting contact with the first connecting conductor track of the transverse web.

The lightweight structure furthermore has a carbon fiber structural battery, in particular a rechargeable carbon fiber structural battery. The carbon fiber structural battery comprises a cathode layer, a first collector connected to the cathode layer, an anode layer, a second collector connected to the anode layer, and a separator layer arranged between the anode layer and the cathode layer. The carbon fiber structural battery is connected to the central web of the transverse member in an areal manner. The first collector is electrically connected to the first or the second connecting conductor track and the second collector is electrically connected to the respectively other connecting conductor track. The carbon fiber structural battery is therefore attached as a kind a reinforcing panel to the central web of the transverse member and thus increases the mechanical stiffness of the transverse member. The collectors are connected to the connecting conductor tracks provided on the first surface in an electrically conducting manner. This makes it possible for a voltage provided by the battery to be tapped off at the connecting conductor tracks or at the first collecting conductor track of the longitudinal member and at the second connecting conductor track.

According to a second aspect of the disclosure herein, provision is made of an aircraft comprising a lightweight structure according to the first aspect of the disclosure herein. Features and advantages disclosed in connection with one of the aspects of the disclosure herein also apply to the respectively other aspect as disclosed.

An idea on which the disclosure herein is based consists in firmly connecting a carbon fiber structural battery to a central web of a transverse member of a lightweight structure, contacting the collectors of the battery with conductor tracks provided on a transverse web of the transverse member and guiding at least one of the conductor tracks on a rear side of the transverse web and bringing this conductor track into mechanical and electrical contact, in a connection region of the transverse member to a longitudinal member, with a collecting conductor track formed on a web of the longitudinal member.

Since the carbon fiber structural battery is firmly connected to the central web in an areal manner and the carbon fiber structural battery itself has a high mechanical stiffness on account of its layered construction comprising fiber plies embedded into a matrix material, the battery functions as a load-bearing component. This allows the thickness of the central web and thus the weight of the lightweight structure to be reduced with simultaneous integration of an electrical energy store.

A further advantage is that connecting conductor tracks, with which the collectors of the carbon fiber structural battery are in contact, are provided on the transverse web of the transverse member. This means that cables are not necessarily required for the electrical connection of the battery, which makes the fitting of the battery easier. Since at least the first connecting conductor track also extends on the second surface of the transverse web, the second surface facing toward the contact surface of the base web of the longitudinal member, contact is automatically made between the first connecting conductor track and the first collecting conductor track of the longitudinal member during the fitting of the transverse member on the longitudinal member. This further reduces the cabling outlay and makes the fitting easier.

Advantageous configurations and refinements are disclosed herein in conjunction with the description.

According to some embodiments of the lightweight structure, provision may be made for the carbon fiber structural battery to have a rectangular cross section. By way of example, the carbon fiber structural battery may be implemented in the form of a rectangular panel. A high energy density in relation to the volume of the battery is obtained in this way. At the same time, a high bending resistance in relation to a bending direction can be obtained.

According to some embodiments, provision may be made for the carbon fiber structural battery to be adhesively bonded or welded to the central web of the transverse member. Adhesive bonding or welding afford the advantage that a large joining area between the battery and the central web can be provided in a simple manner, and thus the areal loading of the connection can be reduced. This improves the force flow between the central web and the battery and thus advantageously influences the mechanical stiffness of the transverse member.

According to some embodiments, the central web of the transverse member may have a recess in which the carbon fiber structural battery is accommodated. For example, the central web may have a depression, the size of which corresponds to the size of the battery. The depression or the recess is in this case preferably designed in such a way that a surface of the battery lies flush with a side surface, which surrounds the recess, of the central web when the battery is accommodated in the recess. If the transverse member is implemented with an H-shaped or a U-shaped cross section, which is defined by the central web, a first transverse web and a second transverse web which is situated opposite to the first transverse web and which extends transversely with respect to the central web, the recess may advantageously have, in relation to a direction between the first and the second transverse web, a width which is smaller than a distance between the first and the second transverse web. This makes the fitting of the battery or the insertion of the battery into the recess even easier.

According to some embodiments, the lightweight structure may comprise at least one further carbon fiber structural battery having a cathode layer, a first collector connected to the cathode layer, an anode layer, a second collector connected to the anode layer, and a separator layer arranged between the anode layer and the cathode layer, wherein the further carbon fiber structural battery is connected to the central web of the transverse member in an areal manner, and wherein the first collector of the further carbon fiber structural battery is electrically connected to the second connecting conductor track and the second collector of the further carbon fiber structural battery is electrically connected to a further connecting conductor track composed of an electrically conducting material which runs at least on the first surface of the transverse web of the transverse member. It is accordingly possible for a plurality of carbon fiber structural batteries to be arranged on the same side or on different sides of the central web, the carbon fiber structural batteries being able to be electrically connected in series or in parallel via the second connecting conductor track and possibly further connecting conductor tracks. Via a further connecting conductor track and, a voltage of the batteries between the first collecting conductor track and the connecting conductor track can be tapped off.

According to further embodiments, provision may be made for the transverse web to protrude beyond a first side surface of the central web and beyond a second side surface of the central web, the second side surface being situated opposite to the first side surface, wherein the first connecting conductor track extends on a first side, which is defined by the first side surface of the central web, of the transverse member on the first surface of the transverse web and ends on the second surface of the transverse web, wherein the second connecting conductor track extends on the first side of the transverse member on the first surface of the transverse web, on the second surface of the transverse web and on a second side, which is defined by the second side surface of the central web, of the transverse member on the first surface of the transverse web, wherein the transverse web additionally has a third connecting conductor track composed of an electrically conducting material which extends in the region of the first end portion on the second side of the transverse member on the first surface of the transverse web and which ends on the second surface of the transverse web, wherein the third connecting conductor track is in contact with a second collecting conductor track which is provided on the contact surface of the base web and which is composed of an electrically conducting material, wherein a first carbon fiber structural battery is connected to the first side surface of the central web in an areal manner and a second carbon fiber structural battery is connected to the second side surface of the central web in an areal manner, and wherein a first collector of the first carbon fiber structural battery is electrically connected to the first connecting conductor track, a second collector of the first carbon fiber structural battery is electrically connected to the second connecting conductor track, a first collector of the second carbon fiber structural battery is electrically connected to the second connecting conductor track, and a second collector of the second carbon fiber structural battery is electrically connected to the third connecting conductor track. According to this embodiment, a series connection comprising two carbon fiber structural batteries which are arranged on different sides of the central web is implemented. This results in a very compact construction with a symmetrical arrangement of the batteries in relation to the central web, which is advantageous with regard to the stiffness of the transverse member. In particular, the thickness of the central web can thus be reduced from two sides, as a result of which the weight with a given number of batteries can be further reduced. A further advantage is that both the first and the second collecting conductor track are arranged on the longitudinal member, as a result of which it is possible for the voltage provided by the batteries to be tapped off in a simple manner.

According to further embodiments, provision may be made for the transverse web to protrude at least beyond a first side surface of the central web, wherein the first connecting conductor track extends on the first surface of the transverse web and ends on the second surface of the transverse web, wherein the second connecting conductor track extends exclusively on the first surface of the transverse web, wherein the transverse web additionally has a third connecting conductor track composed of an electrically conducting material which extends at least on the first surface of the transverse web, wherein a first carbon fiber structural battery and a second carbon fiber structural battery are each connected to the first side surface of the central web in an areal manner, and wherein a first collector of the first carbon fiber structural battery is electrically connected to the first connecting conductor track, a second collector of the first carbon fiber structural battery is electrically connected to the second connecting conductor track, a first collector of the second carbon fiber structural battery is electrically connected to the second connecting conductor track, and a second collector of the second carbon fiber structural battery is electrically connected to the third connecting conductor track. In this way, a series connection of at least two batteries which are arranged on the same side of the central web is implemented. This is particularly advantageous if the structural space on the other side of the central web is limited or a large number of batteries are intended to be connected in series. It is of course additionally also possible for carbon fiber structural batteries to be arranged on the rear side or the second side of the central web, the carbon fiber structural batteries being able to be connected in series with the batteries arranged on the first side via a connecting conductor track extending on the first side of the transverse member on the first surface, a connecting conductor track extending on the second surface and on a second side of the transverse member on the first surface. It is also possible for the batteries to be connected in parallel to one another on the various sides of the central web.

According to further embodiments, provision may be made for the third connecting conductor track to additionally extend on the second surface of the transverse web and to end in the region of the first end portion of the transverse member on the second surface of the transverse web, and wherein the third connecting conductor track is in contact with a second collecting conductor track which is provided on the contact surface of the base web, which is electrically insulated from the first collecting conductor track and which is composed of an electrically conducting material. A series connection comprising two carbon fiber structural batteries can accordingly be implemented in a space-saving manner.

According to further embodiments, provision may also be made for the transverse web to protrude beyond the first side surface of the central web and beyond a second side surface of the central web, the second side surface being situated opposite to the first side surface, wherein the third connecting conductor track extends on a first side, which is defined by the first side surface of the central web, of the transverse member on the first surface of the transverse web, on the second surface of the transverse web and on a second side, which is defined by the second side surface of the central web, of the transverse member on the first surface of the transverse web. The third connecting conductor track is accordingly guided on the second side of the transverse member, where further carbon fiber structural batteries can be arranged and connected. It is thus possible for the battery packing density per transverse member to be advantageously increased.

According to other embodiments, the lightweight structure may comprise a further carbon fiber structural battery having a cathode layer, a first collector connected to the cathode layer, an anode layer, a second collector connected to the anode layer, and a separator layer arranged between the anode layer and the cathode layer, wherein the further carbon fiber structural battery is connected to the central web of the transverse member in an areal manner. By way of example, a first carbon fiber structural battery may be connected to a first side surface of the central web and a second carbon fiber structural battery may be connected to a second side surface of the central web, the second side surface being situated opposite to the first side surface. In this case, the second connecting conductor track additionally extends on the second surface of the transverse web, ends in the region of the first end portion of the transverse member on the second surface of the transverse web and is in contact with a second collecting conductor track which is provided on the contact surface of the base web, which is electrically insulated from the first collecting conductor track and which is composed of an electrically conducting material. The transverse web of the transverse member also has a third connecting conductor track composed of an electrically conducting material which extends in the first end portion on the first surface of the transverse web, which ends on the second surface of the transverse web and which is in contact with the first collecting conductor track. Furthermore, the transverse web of the transverse member has a fourth connecting conductor track composed of an electrically conducting material which extends spaced apart from the third connecting conductor track on the first surface of the transverse web, which ends in the region of the first end portion of the transverse member on the second surface of the transverse web and which is in contact with the second collecting conductor track, wherein the first collector of the further carbon fiber structural battery is electrically connected to a third connecting conductor track and the second collector of the further carbon fiber structural battery is electrically connected to the fourth connecting conductor track. Accordingly, a parallel connection of two carbon fiber structural batteries is advantageously implemented.

According to some embodiments, the lightweight structure may comprise a second longitudinal member which extends spaced apart from and along the first longitudinal member, wherein the transverse member is connected to the second longitudinal member at a second end portion situated opposite to the first end portion.

According to some embodiments, provision may be made for the transverse member to have a further transverse web extending transversely with respect to the central web, wherein the transverse webs are arranged at opposite ends of the central web, such that the central web and the transverse webs define an H-shaped, a Z-shaped or a U-shaped cross section of the transverse member.

According to some embodiments of the aircraft, provision may be made for the first longitudinal member to extend in a wing longitudinal direction of a wing of the aircraft and to form a first longitudinal wing spar, and wherein the transverse member extends in a wing depth direction and forms a rib of the wing. Optionally, an outer skin is fastened to the rib and/or the longitudinal wing spar.

In this document, a carbon fiber structural battery is understood to mean an electrochemical cell which has at least one cathode layer having at least one ply composed of carbon fibers coated with lithium ions, at least one anode layer having at least one ply composed of carbon fibers, and at least one separator layer which is arranged in each case between an anode layer and a cathode layer and which has at least one ply composed of electrically insulating fibers, wherein the cathode layer, the anode layer and the separator layer are each embedded into an electrolytic polymer matrix material, preferably into the same polymer matrix material. The lithium ion coating may in particular be a lithium metal oxide or phosphate, for example $LiFePO_4$ or $LiMnO_2$. The electrically insulating fibers may be glass fibers, for example. The electrolytic polymer matrix material may in particular be a thermoset material, for example an epoxy material.

In this document, with regard to directional statements and axes, in particular to directional statements and axes which relate to the profile of physical structures, a profile of an axis, of a direction or of a structure "along" another axis, direction or structure is understood to mean that these, in particular the tangents produced at a respective point of the structures, each run at an angle of less than 45 degrees relative to one another, preferably less than 30 degrees relative to one another, and particularly preferably parallel to one another.

In this document, with regard to directional statements and axes, in particular to directional statements and axes which relate to the profile of physical structures, a profile of an axis, of a direction or of a structure "transversely" with respect to another axis, direction or structure is understood to mean that these, in particular the tangents produced at a respective point of the structures, each run at an angle of greater than or equal to 45 degrees relative to one another, preferably greater than or equal to 60 degrees relative to one another, and particularly preferably perpendicular to one another.

BRIEF DESCRIPTION OF THE DRAWINGS

The disclosure herein will be explained below with reference to the figures of the drawings. In the figures.

DETAILED DESCRIPTION

In the figures, the same reference designations denote identical or functionally identical components, unless stated otherwise.

Figure 1:
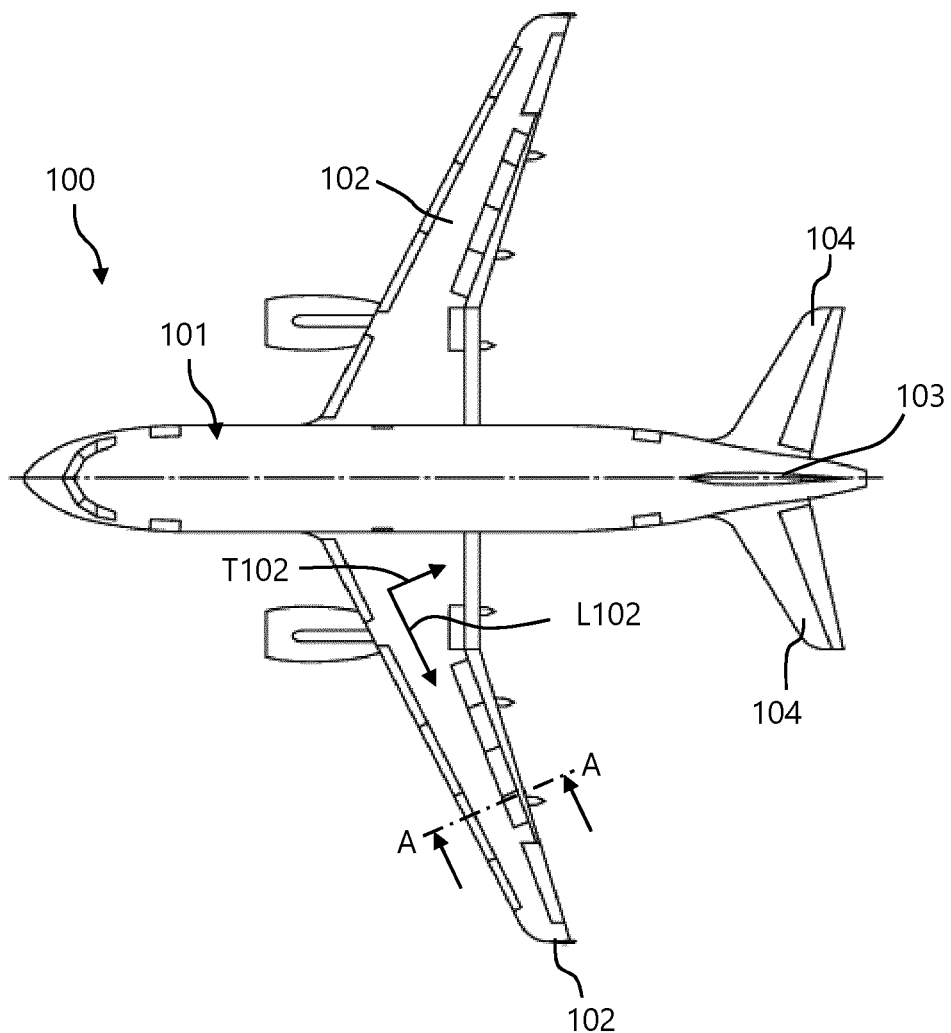
FIG. 1 shows a schematic view of an aircraft according to an example embodiment of the disclosure herein.

FIG. 1 shows, by way of example, an aircraft 100 which has a fuselage 101, wings 102 projecting laterally from the fuselage 101, and also a vertical tail 103 and a horizontal tail 104 which are arranged in an end region of the fuselage 101. The wings 102 extend in a wing longitudinal direction L102 from the fuselage 101 and have an areal extent in a wing depth direction T102.

Figure 2:
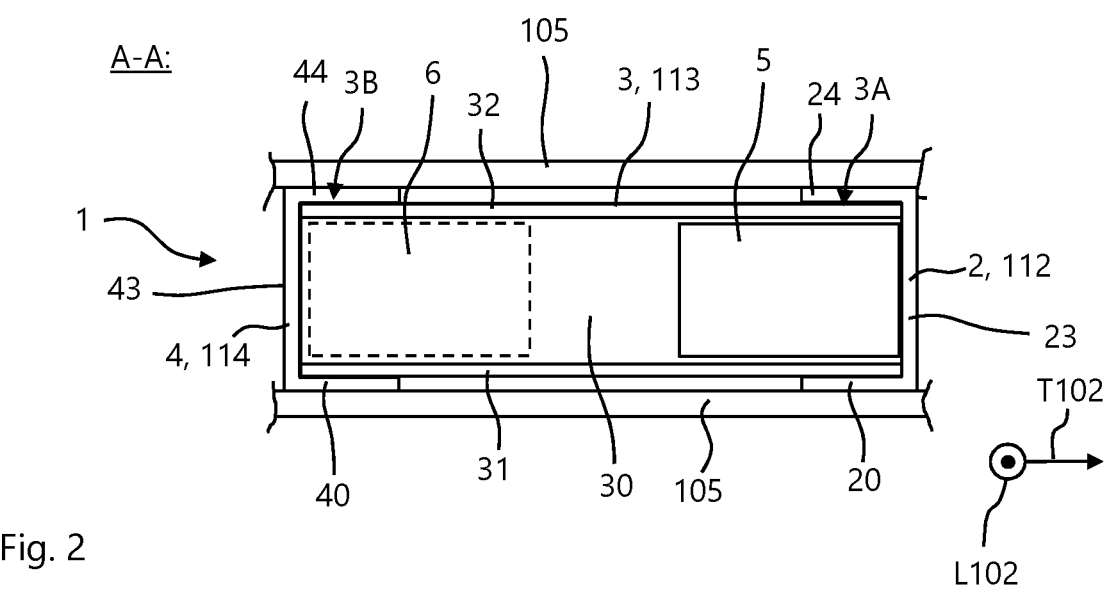
FIG. 2 shows a broken-away sectional view of a wing of the aircraft that results from a section along line A-A shown in FIG. 1, the wing having a lightweight structure according to an example embodiment of the disclosure herein.

FIG. 2 shows, by way of example, a sectional view of the wing 101. As illustrated by way of example in FIG. 2, the wing 101 can have a lightweight structure 1 comprising a first longitudinal member 2, a second longitudinal member 4, a transverse member 3 and at least one carbon fiber structural battery 5, 6. The longitudinal members 2, 4 each extend along the wing longitudinal direction L102 and are arranged spaced apart from one another in the wing depth direction T102. The transverse member 3 extends along the wing depth direction T102 between the longitudinal members 2, 4 and is mechanically connected thereto, for example adhesively bonded, welded, riveted or screwed thereto or connected thereto in a similar manner. As shown by way of example in FIG. 2, it is for example possible for an outer skin 105 of the wing 102 to be connected to the longitudinal members 2, 4. In the lightweight structure 1 shown by way of example in FIG. 2, the longitudinal members 2, 4 each form longitudinal wing spars 112, 114 and the transverse member 3 forms a rib 113.

As illustrated by way of example and merely schematically in FIG. 2, it is possible for one or more carbon fiber structural batteries 5, 6 to be arranged on or fastened to the transverse member 2. FIG. 2 illustrates, by way of example, that a first and a second carbon fiber structural battery 5, 6 are attached to a central web 30 of the transverse member 2. It is of course also possible for more or less than two carbon fiber structural batteries 5, 6 to be provided. The lightweight structure 1 will be explained in detail below. The lightweight structure 1 is of course not limited to the use in the wing 102 of an aircraft 100. It is for example also possible for the lightweight structure 1 to be installed in the fuselage 101 of the aircraft 100 or in other vehicles, such as for example in the body of a road vehicle.

Figure 3:
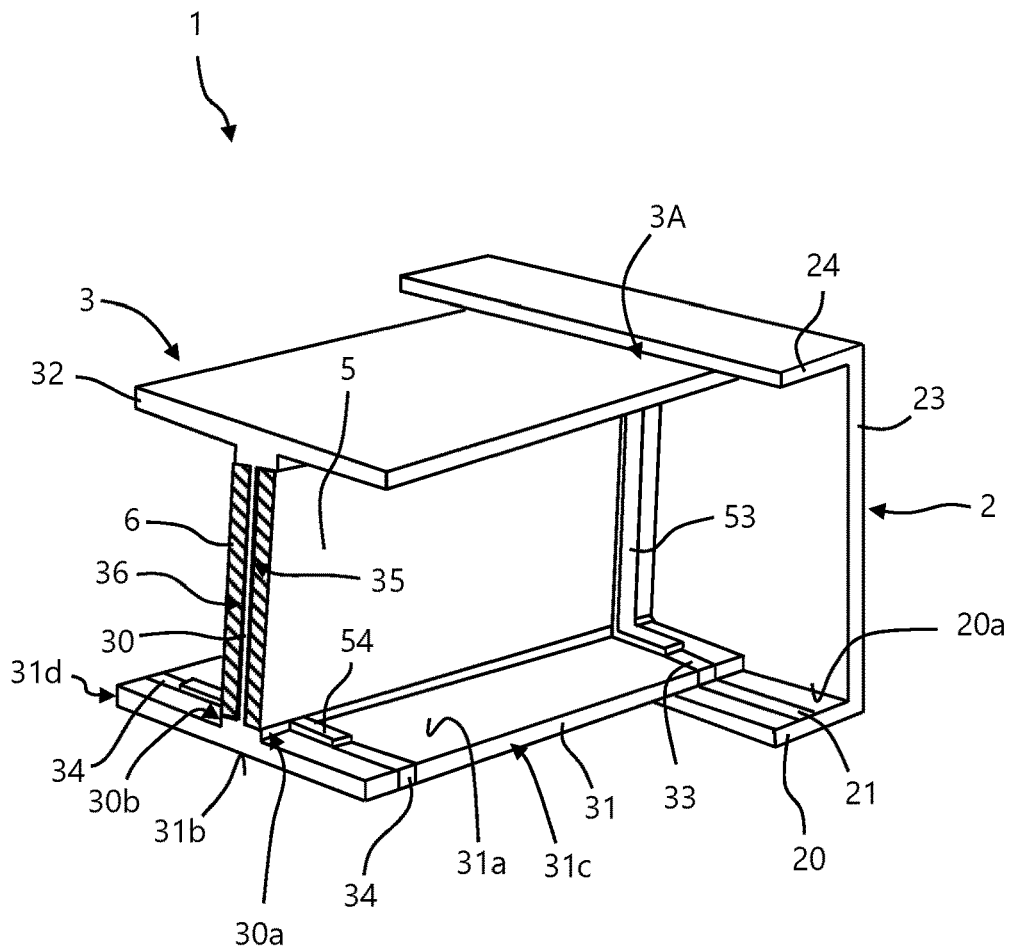
FIG. 3 shows a perspective view of a lightweight structure according to an example embodiment of the disclosure herein in a schematic illustration.
Figure 4:
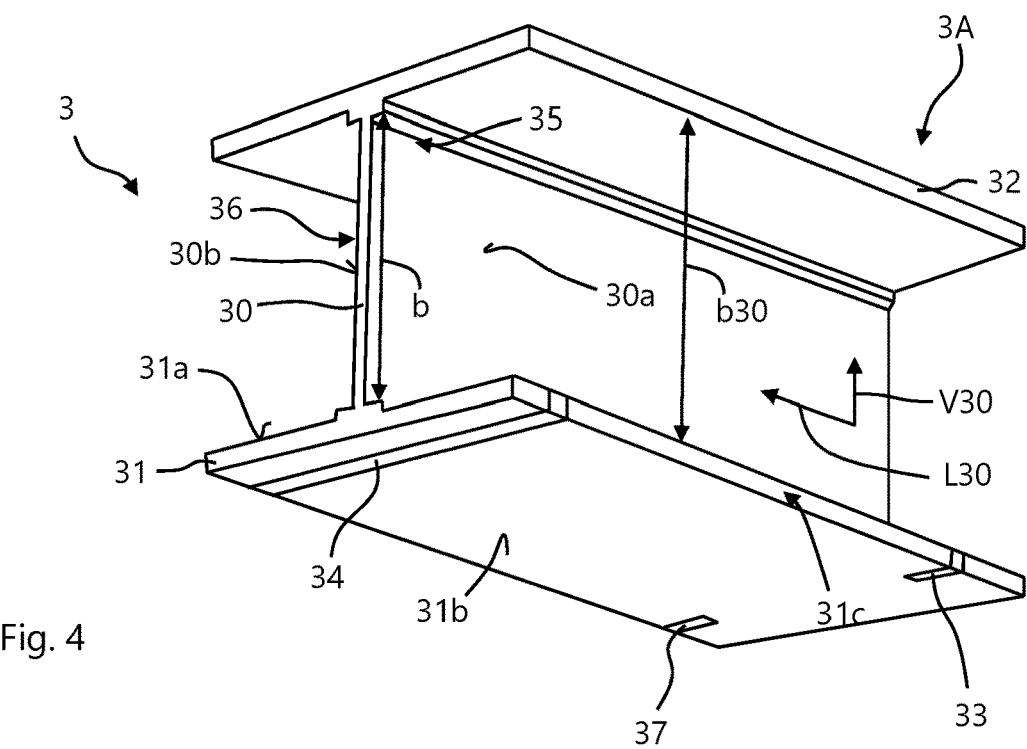
FIG. 4 shows a perspective view of a transverse member of the lightweight structure shown in FIG. 3.
Figure 5:
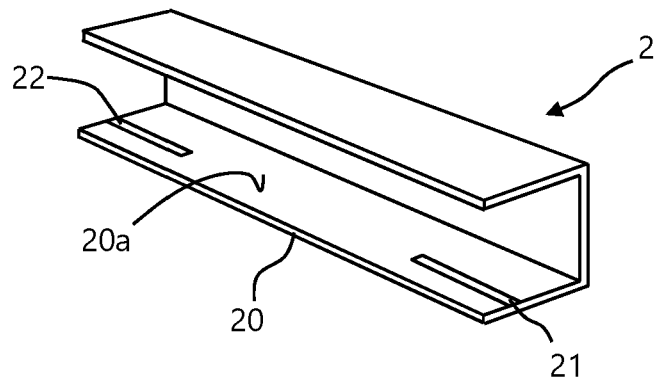
FIG. 5 shows a perspective view of a longitudinal member of the lightweight structure shown in FIG. 3.
Figure 6:
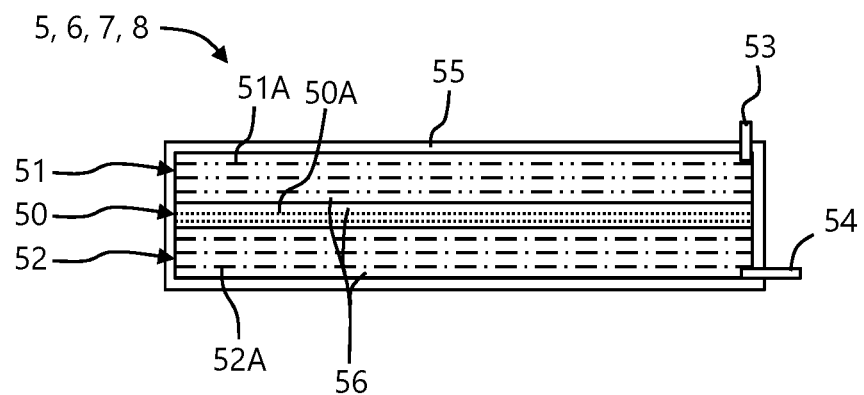
FIG. 6 shows a schematic sectional view of a carbon fiber structural battery of a lightweight structure according to an example embodiment of the disclosure herein.

FIG. 3 shows, by way of example, a lightweight structure 1 comprising a longitudinal member 2, a transverse member 3, a first carbon fiber structural battery 5 and an optional second carbon fiber structural battery 6. FIG. 4 shows, by way of example, a perspective view of the transverse member 3. FIG. 5 shows, by way of example, a perspective view of the longitudinal member 2. FIG. 6 shows, by way of example and purely schematically, a sectional view of a carbon fiber structural battery 5.

As is illustrated by way of example in FIGS. 3 and 5, the longitudinal member 2 can be implemented with a U-shaped cross section, for example. In general, the longitudinal member 2 has at least one first or lower base web 20. It is optionally possible for the longitudinal member 2 to additionally have a main web 23 extending transversely with respect to the lower base web 20 and a likewise optional second, upper base web 24 extending from the main web 23 parallel to the lower base web 20. It goes without saying that other cross-sectional shapes are also conceivable, for example an L-shaped cross section defined by the first base web 20 and the main web 23 or a Z-shaped cross section defined by the first base web 20, the main web 23 and the second base web 24. The longitudinal member 2 can be formed, for example, from a fiber composite material, for example a carbon-fiber-reinforced thermoplastic material, or from a metal material, such as for example an aluminum alloy. The optional second longitudinal member 4 shown by way of example in FIG. 2 can generally be constructed in the same way as the first longitudinal member 2, that is to say with a base web 40, an optional main web 43 and a likewise optional second base web 44.

As can be seen in particular in FIG. 5, the longitudinal member has, on a contact surface 20a of the base web 20, a first collecting conductor track 21 composed of an electrically conductive material. The first collecting conductor track 21 can run in particular along the base web 20 or along a longitudinal extent of the base web 20. It is optionally possible for a second collecting conductor track 22 to additionally be formed on the contact surface 20a of the base web 20, the second collecting conductor track being electrically insulated from the first collecting conductor track 21. As shown by way of example in FIG. 5, the second collecting conductor track 22 can be arranged spaced apart from the first collecting conductor track 22 along the longitudinal extent of the base web 20. By way of example, the collecting conductor tracks 21, 22 can be adhesively bonded to the contact surface 20a or be printed thereon, for example by a 3D printing process.

As is illustrated by way of example in FIGS. 3 and 4, the transverse member 3 has a central web 30 and a first transverse web 31 extending transversely with respect to the central web, the first transverse web 31 being arranged at a first, lower end of the central web 30. It is optionally possible for the transverse member 3 to additionally have a second transverse web 32 which is arranged at a second, upper end of the central web 30. As shown by way of example in FIGS. 3 and 4, provision may be made for the first transverse web 31 to protrude both beyond a first side surface 30a of the central web 30 and beyond a second side surface 30b of the central web 30, the second side surface being situated opposite to the first side surface 30a. In a similar manner, it is also possible for the optional second transverse web 32 to protrude both beyond the first side surface 30a and beyond the second side surface 30b of the central web 30. It is thus for example possible for the central web 30 and the transverse webs 31, 32 to define an H-shaped cross section of the transverse member 3, as is shown by way of example in FIGS. 3 and 4. However, the transverse member 3 may also have a different cross-sectional shape, for example an L-shaped or T-shaped cross section defined by the first transverse web 31 and the central web 30 or a Z-shaped cross section defined by the central web 30, the first and the optional second transverse web 31, 32. The first side surface 30a of the central web 30 defines a first side of the transverse member 3. The second side surface 30b of the central web 30 defines a second side of the transverse member 3. The central web 30 and the transverse webs 31, 32 extend in a transverse member longitudinal direction L30 between a first end portion 3A and a second end portion 3B situated opposite the latter. In the lightweight structure 1 shown by way of example in FIG. 2, the first end portion 3A of the transverse member 3 is connected to the first longitudinal member 2 and the second end portion 3B of the transverse member 3 is connected to the second longitudinal member 4.

As can be seen in particular in FIG. 4, the transverse member 3 can have an optional recess 35 which is defined by the first side surface 30a of the central web 30. As is shown by way of example in FIG. 4, the recess can have, in relation to a vertical direction V30 extending from the first transverse web 31 along the central web 30, a width b which is smaller than a width b30 of the central web 30. In the example of FIGS. 3 and 4, the width b30 of the central web 30 corresponds to a distance between the first and the second transverse web 31, 32. Furthermore, it is optionally also possible for a recess 36 to be formed on the second side surface 30b of the central web 30, the recess being implemented in the same way as the recess 35 on the first side surface 30a.

The transverse member 3 can be formed, for example, from a fiber composite material, for example a carbon-fiber-reinforced thermoplastic material, or from a metal material, such as for example an aluminum alloy.

As is illustrated by way of example and purely schematically in FIGS. 3 and 4, the first transverse web 31 of the transverse member 3 can have a first connecting conductor track 33 and a second connecting conductor track 34, which are each formed from an electrically conductive material. It is optionally also possible for at least one further connecting conductor track, for example a third connecting conductor track 37 composed of an electrically conductive material, to be provided on the first transverse web 31. The connecting conductor tracks 33, 34, 37 are each firmly connected to the transverse web 31, for example adhesively bonded thereto or printed thereon, for example in a 3D printing process.

As is shown by way of example in FIGS. 3 and 4, the first connecting conductor track 33, 34 can be arranged in the region of the first end portion 3A of the transverse member 3. It is also possible for the first connecting conductor track 33 to extend on the first side of the transverse member 3 on the first surface 31a of the transverse web 31 and on the second surface 31b of the transverse web 31 and to end on the second surface, as is illustrated by way of example in FIGS. 3 and 4. As shown by way of example in FIGS. 3 and 4, provision may in particular be made for the first connecting conductor track 33 to run in an uninterrupted manner on the first side of the transverse member 3 on the first surface 31a of the transverse web 31, on a first edge 31c connecting the first and the second surface 31a, 31b and on the second surface 31b and to end on the second surface 31b of the transverse web 31, optionally on the first side of the transverse member 3. In general, the first connecting conductor track extends in the region of a first end portion 3A of the transverse member 3 on the first surface 31a and the second surface 31b of the transverse web 31.

The second connecting conductor track 34 is electrically insulated from the first connecting conductor track 33 or formed separately therefrom on the transverse web 31. In particular, the second connecting conductor track 34 is arranged spaced apart from the first connecting conductor track along the transverse member longitudinal direction L30, as is illustrated by way of example in FIGS. 3 and 4. It is for example possible for the second connecting conductor track 34 to extend in an uninterrupted manner on the first side of the transverse member 3 on the first surface 31a of the transverse web 31, on the first edge 31c, on the second surface 31b of the transverse web 31, on a second edge 31d connecting the first and the second surface 31a, 31b on the second side and on the second side of the transverse member 3 on the first surface 31a of the transverse web 31, as is illustrated by way of example in FIGS. 3 and 4. However, it is also possible for the second connecting conductor track 34 to extend exclusively on the first surface 31a of the transverse web 31, for example with a U-shaped profile, as is illustrated by way of example in FIG. 7 and will be explained in more detail below. In general, the second conductor track extends at least on the first surface 31a of the transverse web 31.

The optional third connecting conductor track 37 can extend, for example, in the region of the first end portion 3A on the second side of the transverse member 3 on the first surface 31a of the transverse web 31, on the second edge 31d and on the second surface 31b of the transverse web 31 and end on the second surface, optionally on the second side of the transverse member 3, as illustrated by way of example in FIG. 4. It is for example possible for the third connecting conductor track 37 to run, in relation to the central web 30 of the transverse member 3, in a mirror-symmetrical manner with respect to the first connecting conductor track 33. However, it is also conceivable for the third connecting conductor track 37 to run on the first side of the transverse member 3 on the first surface 31a, the first edge 31c and the second surface 31b of the transverse web 31 and to end in the region of the first end portion 3A of the transverse member 3 on the second surface 31b, as is illustrated by way of example in FIG. 7. It is furthermore conceivable for the third connecting conductor track 37 to extend in an uninterrupted manner on the first side of the transverse member 3 on the first surface 31a of the transverse web 31, on the first edge 31c, on the second surface 31b of the transverse web 31, on a second edge 31d connecting the first and the second surface 31a, 31b on the second side and on the second side of the transverse member 3 on the first surface 31a of the transverse web 31, as is illustrated by way of example in FIG. 8. In general, the third connecting conductor track 37 extends at least on the first surface 31a of the transverse web 31 of the transverse member 3.

As is illustrated by way of example in FIG. 3 and has already been explained on the basis of FIG. 2, the transverse member 3 extends transversely with respect to the longitudinal member 2. The transverse web 31 of the transverse member 3 overlaps the base web 20 of the longitudinal member 2 in the region of the first end portion 3A of the transverse member 3, the second surface 31a of the transverse member 3 facing toward the contact surface 20a of the base web 20, as is illustrated by way of example in FIG. 3. It is for example possible for the transverse member 3 to be arranged in abutment with the optional main carrier 23 of the longitudinal member 2. The transverse member 3 and the longitudinal member 2 are also fastened or connected, for example screwed, riveted, adhesively bonded, welded, or the like, to one another in the region of the first end portion 3A of the transverse member 3. In particular, the transverse member 3 and the longitudinal member 2 are positioned relative to one another in such a way that the first connecting conductor track 33 of the transverse member 3 is in contact, by way of its portion provided on the second surface 31a of the transverse web 31, with the first collecting conductor track 21 of the base web 20 of the first longitudinal member 2. Thus, the first collecting conductor track 21 and the first connecting conductor track 33 touch and thus form an electrically conducting contact. In the lightweight structure 3 illustrated by way of example in FIG. 3, the transverse member 3 and the longitudinal member 2 are also positioned relative to one another in such a way that the third connecting conductor track 37 is in contact, by way of its portion provided on the second surface 31a of the transverse web 31, with the second collecting conductor track 22 and thus forms an electrical contact therewith.

As illustrated by way of example in FIG. 3, a first carbon fiber structural battery 5 can be arranged on the first side surface 30a of the central web 30 of the transverse member 3 and an optional second carbon fiber structural battery 6 can be arranged on the second side surface 30a of the central web 30 of the transverse member 3. The carbon fiber structural batteries 5, 6 are each connected to the central web 30 in an areal manner, for example adhesively bonded or welded to the respective side surface 30a, 30b. As is illustrated purely schematically in FIG. 3, the carbon fiber structural batteries 5, 6 can be accommodated in the respective optional recess 34, 35, which are formed on the side surfaces 30a, 30b. It is for example possible for the carbon fiber structural batteries 5, 6 to have a rectangular cross section, as is shown by way of example in FIG. 3. The optional recess 34, 35 are preferably designed to correspond to the outer size of the carbon fiber structural batteries 5, 6.

FIG. 6 shows, in purely schematic form, a sectional view of a carbon fiber structural battery 5. As is illustrated by way of example in FIG. 6, the carbon fiber structural battery 5 has a cathode layer 51, an anode layer 52, a separator layer 50, a first collector 53 and a second collector 54, and may also have an optional casing 55.

As is illustrated purely symbolically in FIG. 6 by way of double dashed and dotted lines, the cathode layer 51 comprises at least one, preferably a plurality of plies composed of carbon fibers 51A coated with lithium ions. The lithium ion coating of the carbon fibers 51A can in particular be a lithium metal oxide or phosphate, for example LiFePO4 or LiMnO2. The anode layer 52 has one or more plies composed of carbon fibers 52A, which are illustrated purely symbolically in FIG. 6 in the form of dashed and dotted lines. The separator layer 50 is arranged between the anode layer 52 and a cathode layer 51 and has one or more plies composed of electrically insulating fibers 50A, such as for example glass fibers, which are illustrated symbolically in FIG. 6 by way of dotted lines. The cathode layer 51, the anode layer 52 and the separator layer 50 are each embedded into an electrolytic polymer matrix material 56, preferably into the same polymer matrix material. The electrolytic polymer matrix material can in particular be a thermoset material, for example an epoxy material. As illustrated by way of example in FIG. 6, the cathode layer 51, the anode layer 52 and the separator layer 50 can be encapsulated in the casing 55, which can be implemented, for example, in the form of a metal foil coated with a thermoplastic material. The first collector 53 is connected to the cathode layer 51 in an electrically conducting manner and may extend, if applicable, through the optional casing 55. The second collector 54 is connected to the anode layer 52 in an electrically conducting manner and may extend, if applicable, through the optional casing 55.

The construction of the first carbon fiber structural battery 5 explained by way of example on the basis of FIG. 6 also applies to all further carbon fiber structural batteries 6, 7, 8 described herein. Since the carbon fiber structural batteries 5, 6, 7, 8, on account of the layered construction comprising carbon fibers 51A, 52A which are embedded into the polymer matrix material 55, these have a high mechanical stiffness and load-bearing capacity. On account of the areal connection to the first side surface 31a or the second side surface 31b of the central web 30 of the transverse member 3, the mechanical stiffness of the transverse member 3 is increased by the batteries 5, 6, 7, 8 and a thickness and thus the weight of the central web 30 can be reduced for a given stiffness requirement.

As can be seen by way of example in FIG. 3, the first collector 53 is in mechanical contact with the first connecting conductor track 34 and thus electrically connected to the first connecting conductor track 33. Alternatively, it is also possible for the second collector 54 to be in mechanical contact with the first connecting conductor track 34 and thus to be electrically connected to the first connecting conductor track 33. The second collector 54 is in mechanical contact with the respectively other connecting conductor track 34, 33 and is electrically connected thereto as a result. In the lightweight structure 1 shown by way of example in FIG. 3, the second collector 54 is electrically connected to the second connecting conductor track 34.

In the lightweight structure 1 shown by way of example in FIG. 3, the first carbon fiber structural battery 5 and the optional second carbon fiber structural battery 6 are electrically connected in series. To this end, the a first collector 53 of the second carbon fiber structural battery 6 is in contact with the second connecting conductor track 34, and thus electrically connected thereto, on the second side of the transverse member 3 on the first surface 31a of the transverse web 31. A second collector 54 of the second carbon fiber structural battery 6 is in contact with that portion of the third connecting conductor track 37 which runs on the first surface 31a of the transverse web 31, and is thus electrically connected to the third connecting conductor track 37. It is thus possible for a voltage provided by the carbon fiber structural batteries 5, 6 to be tapped off at the collecting conductor tracks 21, 22.

FIG. 3 shows, by way of example, a lightweight structure 1 in which is arranged on the first side surface 30a of the central web 30 of the transverse member 3 and an optional second carbon fiber structural battery 6 is arranged on the second side surface 30a of the central web 30 of the transverse member 3. It is of course also possible for merely one carbon fiber structural battery 5 to be arranged on the central web 30. It is also conceivable for a first carbon fiber structural battery 5 and a second carbon fiber structural battery 6 to each be connected to the first side surface 30a of the central web 30 in an areal manner, as is illustrated by way of example in FIG. 7. As has already been briefly explained, the second connecting conductor track 34 can in this case extend exclusively on the first surface 31a of the transverse web 31, and the optional third connecting conductor track 37 extends at least on the first surface 31a of the transverse web 31. As illustrated by way of example in FIG. 7, the second connecting conductor track 34 can have a U-shaped profile, two limbs of the connecting conductor track 34 each running transversely with respect to the central web 30 and a further limb that connects these limbs running along the transverse member longitudinal direction L30 or along the central web 30. The third conductor track 37 can run, in particular, on the first side of the transverse member 3 on the first surface 31a, the first edge 31c and the second surface 31b of the transverse web 31 and end in the region of the first end portion 3A of the transverse member 3 on the second surface 31b, as is shown by way of example in FIG. 7.

Figure 7:
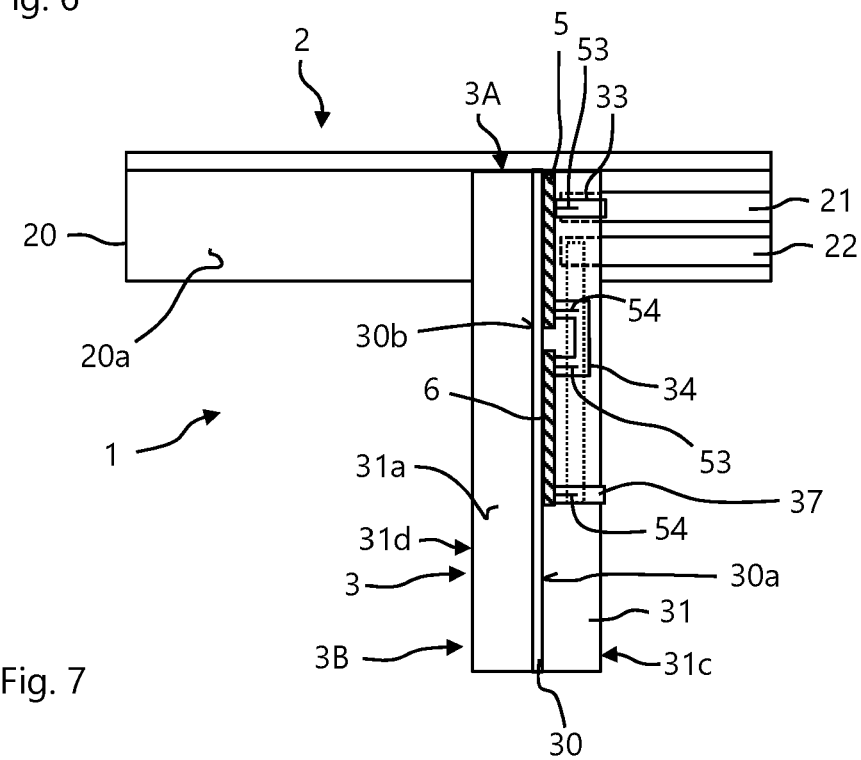
FIG. 7 shows a top view of a lightweight structure according to a further example embodiment of the disclosure herein.

As is furthermore illustrated by way of example in FIG. 7, the first and the optional second collecting conductor track 21, 22 can also be arranged next to one another. As can be seen in FIG. 7, the optional third connecting conductor track 27, which ends in the region of the first end portion 3A on the second surface 31a of the transverse web 31, is in contact with the second connecting conductor track 22 and thus electrically connected thereto. The first collector 53 of the first carbon fiber structural battery 5 is in contact with, and thus electrically connected to, the first connecting conductor track 33 and the second collector 54 of the first carbon fiber structural battery 5 is in contact with, and thus electrically connected to, the second connecting conductor track 34. The first collector 53 of the second carbon fiber structural battery 6 is also in contact with, and thus electrically connected to, the second connecting conductor track 34. The second collector 54 of the second carbon fiber structural battery 6 is in contact with, and thus electrically connected to, that portion of the third connecting conductor track 37 which runs on the first surface 31a of the transverse web 31.

Figure 8:
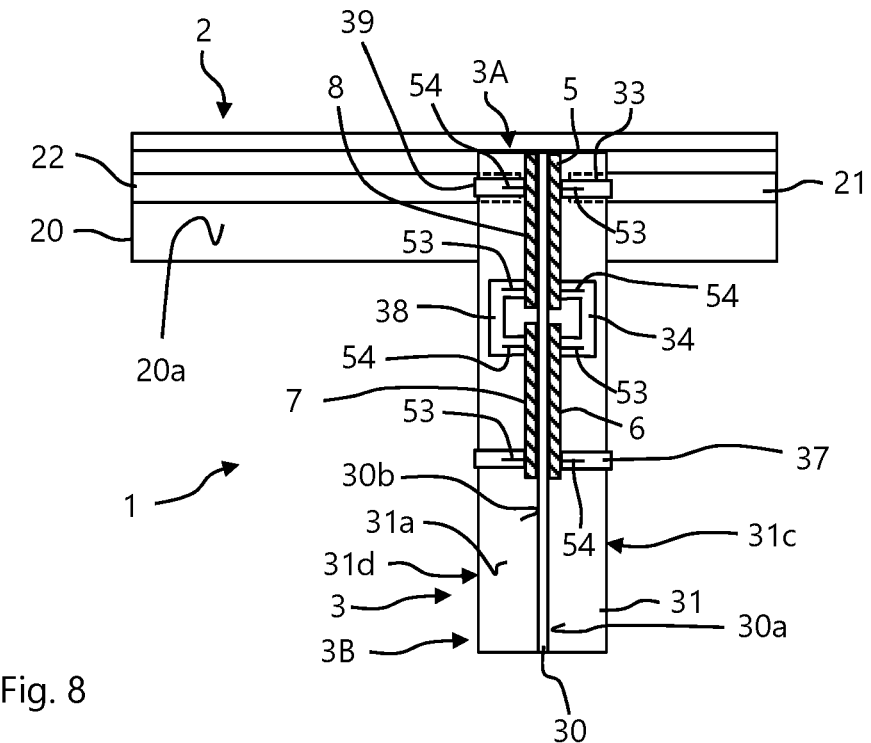
FIG. 8 shows a top view of a lightweight structure according to a further example embodiment of the disclosure herein.

As is shown by way of example in FIG. 8, a first and a second carbon fiber structural battery 5, 6 can be connected to the first side surface 30a of the central web 3 in an areal manner, and a third carbon fiber structural battery 7 and a fourth carbon fiber structural battery 8 can be connected to the second side surface 30a of the central web 3 in an areal manner. In contrast to FIG. 7, in FIG. 8, the third connecting conductor track 37 runs in an uninterrupted manner on the first side of the transverse member 3 on the first surface 31a of the transverse web 31, on the first edge 31c, on the second surface 31b of the transverse web 31, on the second edge 31d and on the second side of the transverse member 3 on the first surface 31a of the transverse web 31.

It is also possible for an optional fourth connecting conductor track 38 to be provided, which runs at least on the first surface 31a of the transverse web 31. As is illustrated by way of example in FIG. 8, provision may be made for the fourth connecting conductor track 38 to run on the second side of the transverse member exclusively on the first surface 31a of the transverse web 31, for example in a U-shaped manner as is illustrated schematically in FIG. 8. A further optional fifth connecting conductor track 39 may be provided in the region of the first end portion 3A of the transverse web. As illustrated by way of example in FIG. 8, it is for example possible for the fifth connecting conductor track 39 to extend on the second side of the transverse web 31 on the first surface 31a, on the second edge 31d and on the second surface 31b of the transverse web 31 and to end on the second surface 31b. As illustrated by way of example in FIG. 8, it is for example possible for the fifth connecting conductor track 39 to be arranged and positioned, in relation to the central web 30, in a mirror-symmetrical manner with respect to the first connecting conductor track 33.

In FIG. 8, the collecting conductor tracks 21, 22 are arranged just like in the lightweight structure 1 shown in FIG. 3. The fifth connecting conductor track 39 is in contact with, and thus electrically connected to, the second collecting conductor track 22.

As is illustrated by way of example in FIG. 8, a first collector 53 of the third battery 7 can be in contact with, and thus electrically connected to, that portion of the third connecting conductor track 37 which runs on the second side of the transverse member 3 on the first surface 31a of the transverse web 31. The second collector 54 of the third battery 7 can be in contact with, and thus electrically connected to, the fourth connecting conductor track 38. A first collector 53 of the fourth battery 8 can also be in contact with, and thus electrically connected to, the fourth connecting conductor track 38. A second collector 54 of the fourth battery 8 can be in contact with, and thus electrically connected to, the fifth connecting conductor track 39. All four carbon fiber structural batteries 5-8 are thus optionally electrically connected in series, as is shown by way of example in FIG. 8. However, it is also conceivable for the first and the second carbon fiber structural battery 5, 6 to be connected in series, as is shown by way of example in FIG. 7, and for the third and the fourth carbon fiber structural battery 6, 7 to similarly be connected in series and, for their part, in parallel with the series-connected first and second carbon fiber structural batteries 5, 6.

Generally speaking, provision may thus be made for the lightweight structure to comprise at least one further carbon fiber structural battery 6, 7, 8 which is connected to the central web 30 of the transverse member 3 in an areal manner, wherein the first collector 53 of the further carbon fiber structural battery 6, 7, 8 is electrically connected to the second connecting conductor track 34 and the second collector 54 of the further carbon fiber structural battery 6, 7, 8 is electrically connected to a further connecting conductor track 37 composed of an electrically conducting material which runs at least on the first surface 31a of the transverse web 31 of the transverse member 3.

Figure 9:
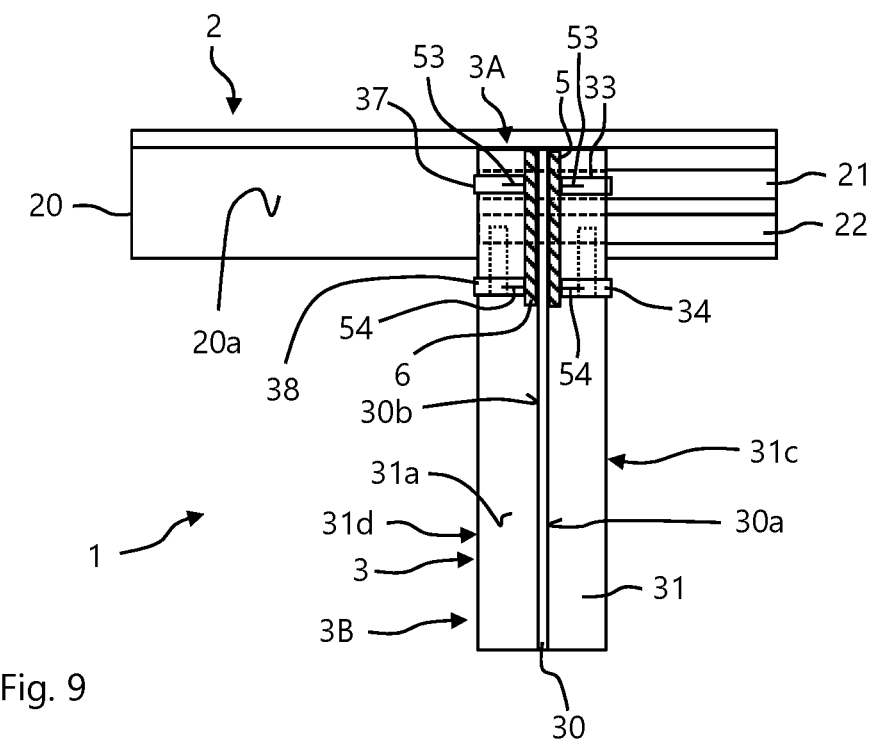
FIG. 9 shows a top view of a lightweight structure according to a further example embodiment of the disclosure herein.

FIG. 9 shows, by way of example, a further lightweight structure 1 which differs from the lightweight structure 1 shown in FIG. 3 in terms of the arrangement of the collecting conductor tracks 21, 22 and in terms of the profile of the second connecting conductor track 34. The lightweight structure 1 shown by way of example in FIG. 9 additionally also comprises a fourth connecting conductor track 38.

As illustrated by way of example in FIG. 9, it is additionally possible for the second connecting conductor track 34 to extend on the second surface 31b of the transverse web 31, in particular on the second side of the transverse member 3, and to end in the region of the first end portion 3A of the transverse member 3 on the second surface 31b of the transverse web 31. Like FIG. 7, FIG. 9 also shows, by way of example, that the first and the second collecting conductor track 21, 22 can run next to one another. The second connecting conductor track 34 is in contact with, and thus electrically connected to, the second collecting conductor track 22.

In the lightweight structure 1 shown by way of example in FIG. 9, the third connecting conductor track 37 extends in the region of the first end portion 3A on the second side of the transverse web 3 on the first surface 31a of the transverse web 31 and ends on the second surface 31b of the transverse web 31. The third connecting conductor track 37 is in contact with, and electrically connected to, the first collecting conductor track 21. In particular, the third connecting conductor track 37 can run in a similar manner to that in FIG. 3 or FIG. 4.

The optional in the fourth connecting conductor track 38 is formed from an electrically conducting material and extends spaced apart from the third connecting conductor track 37 on the first surface 31a of the transverse web 31, ends in the region of the first end portion 3A of the transverse member 3 on the second surface 31b of the transverse web 31 and is in contact with, and thus electrically connected to, the second collecting conductor track. In particular, the fourth connecting conductor track 38 can run in a similar manner to the second connecting conductor track 34, but on the second side of the transverse member 3.

As furthermore illustrated in FIG. 9, the first collector 53 of the second carbon fiber structural battery 6 can be electrically connected to a third connecting conductor track 37 and the second collector 54 of the further carbon fiber structural battery 6 can be electrically connected to the fourth connecting conductor track 38. In this way, a parallel connection of the first and the second battery 5, 6 is implemented.

Although the disclosure herein has been explained above in example fashion on the basis of example embodiments, it is not limited thereto, but rather can be modified in various ways. In particular, combinations of the above-mentioned example embodiments are also conceivable.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1 Lightweight structure
2 First longitudinal member
3 Transverse member
3A First end portion of the transverse member
3B Second end portion of the transverse member 4 Second longitudinal member
5 Carbon fiber structural battery
6, 7, 8 Carbon fiber structural batteries
20 First base web of the first longitudinal member
20a Contact surface
21 First collecting conductor track
22 Second collecting conductor track
23 Main web of the first longitudinal member
24 Second base web of the first longitudinal member
30 Central web of the transverse member
31 First transverse web
31a First surface of the transverse web
31b Second surface of the transverse web
31c First edge
31d Second edge
32 Second transverse web
33 First connecting conductor track
34 Second connecting conductor track
35, 36 Recess
37 Third connecting conductor track
38 Fourth connecting conductor track
39 Fifth connecting conductor track
40 First base web of the second longitudinal member
43 Main web of the second longitudinal member
44 Second base web of the second longitudinal member
50 Separator layer
51 Cathode layer
52 Anode layer
53 First collector
54 Second collector
55 Casing
56 Polymer matrix material
100 Aircraft
101 Fuselage
102 Wing
103 Vertical tail
104 Horizontal tail
112 Longitudinal wing spar
113 Rib
114 Longitudinal wing spar
L30 Transverse member longitudinal direction
L102 Wing longitudinal direction
T102 Wing depth direction

The invention claimed is:

1. A lightweight structure for a vehicle or an aircraft, the lightweight structure comprising:
  a first longitudinal member comprising:
    a main web; and
    a base web which extends transversely to the main web and has, on a contact surface, a first collecting conductor track comprising an electrically conductive material;
  a transverse member comprising:
    a central web; and
    a transverse web that extends transversely with respect to the central web and comprises:
      a first surface;
      a second surface, which is on an opposite side of the central web from the first surface and faces in a same direction as the first surface;
      a first connecting conductor track that comprises an electrically conductive material and extends in a region of a first end portion of the transverse member on the first surface and the second surface; and
      a second connecting conductor track that comprises an electrically conductive material and extends separately from the first connecting conductor track, at least on the first surface;
    wherein the central web of the transverse member is perpendicular to the main web of the first longitudinal member; and
    wherein the transverse web of the transverse member is connected, at the first end portion, to the base web of the first longitudinal member, such that the first connecting conductor track is in contact with the first collecting conductor track of the base web of the first longitudinal member; and
    a further transverse web extending transversely with respect to the central web; and
    the transverse web and the further transverse web are arranged at opposite ends of the central web from each other; and
  a carbon fiber structural battery comprising:
    a cathode layer;
    a first collector connected to the cathode layer;
    an anode layer;
    a second collector connected to the anode layer;
    a separator layer between the anode layer and the cathode layer,
  wherein the carbon fiber structural battery is connected to the central web of the transverse member in an areal manner;
  wherein the first collector is electrically connected to the first connecting conductor track or the second connecting conductor track; and
  the second collector is electrically connected to whichever of the first connecting conductor track and the second connecting conductor track the first collector is not electrically connected.

2. The lightweight structure of claim 1, wherein the carbon fiber structural battery has a rectangular cross section.

3. The lightweight structure of claim 1, wherein the carbon fiber structural battery is adhesively bonded or welded to the central web of the transverse member.

4. The lightweight structure of claim 1, wherein the central web of the transverse member has a recess; and the carbon fiber structural battery is disposed in the recess.

5. The lightweight structure of claim 1, comprising at least one further carbon fiber structural battery comprising:
  a further cathode layer;
  a further first collector connected to the further cathode layer;
  a further anode layer;
  a further second collector connected to the further anode layer; and
  a further separator layer between the further anode layer and the further cathode layer;
  wherein the at least one further carbon fiber structural battery is connected to the central web of the transverse member in an areal manner;
  wherein the further first collector is electrically connected to the second connecting conductor track;
  wherein the transverse web of the transverse member comprises a further connecting conductor track that comprises an electrically conducting material and extends at least on the first surface of the transverse web of the transverse member; and
  wherein the further second collector is electrically connected to the further connecting conductor track.

6. The lightweight structure of claim 5, wherein the transverse web protrudes beyond a first side surface of the central web and beyond a second side surface of the central web, the second side surface being situated opposite to the first side surface;
- the first connecting conductor track extends on a first side, which is defined by the first side surface of the central web, of the transverse member on the first surface of the transverse web and ends on the second surface of the transverse web;
- the second connecting conductor track extends on the first side of the transverse member on the first surface of the transverse web, on the second surface of the transverse web and on a second side, which is defined by the second side surface of the central web, of the transverse member on the first surface of the transverse web;
- the transverse web comprises a third connecting conductor track that comprises an electrically conducting material, extends in the region of the first end portion of the transverse member, on the second side of the transverse member on the first surface of the transverse web, and end on the second surface of the transverse web;
- the third connecting conductor track is in contact with a second collecting conductor track, which is on the contact surface of the base web and comprises an electrically conducting material;
- the carbon fiber structural battery is connected to the first side surface of the central web in an areal manner and the at least one further carbon fiber structural battery is connected to the second side surface of the central web in an areal manner;
- the first collector of the carbon fiber structural battery is electrically connected to the first connecting conductor track;
- the second collector of the carbon fiber structural battery is electrically connected to the second connecting conductor track;
- the further first collector of the at least one further carbon fiber structural battery is electrically connected to the second connecting conductor track; and
- the further second collector of the at least one further carbon fiber structural battery is electrically connected to the third connecting conductor track.

7. The lightweight structure of claim 5, wherein the transverse web protrudes at least beyond a first side surface of the central web;
- the first connecting conductor track extends on the first surface of the transverse web and ends on the second surface of the transverse web;
- the second connecting conductor track extends exclusively on the first surface of the transverse web;
- the transverse web comprises a third connecting conductor track that comprises an electrically conducting material and extends at least on the first surface of the transverse web;
- the carbon fiber structural battery and the at least one further carbon fiber structural battery are each connected to the first side surface of the central web in an areal manner;
- the first collector of the carbon fiber structural battery is electrically connected to the first connecting conductor track;
- the second collector of the carbon fiber structural battery is electrically connected to the second connecting conductor track;
- the further first collector of the at least one further carbon fiber structural battery is electrically connected to the second connecting conductor track; and
- the further second collector of the at least one further carbon fiber structural battery is electrically connected to the third connecting conductor track.

8. The lightweight structure of claim 7, wherein the third connecting conductor track extends on the second surface of the transverse web and ends in the region of the first end portion of the transverse member, on the second surface of the transverse web; and
- the third connecting conductor track is in contact with a second collecting conductor track, which is on the contact surface of the base web, is electrically insulated from the first collecting conductor track, and comprises an electrically conducting material.

9. The lightweight structure of claim 7, wherein the transverse web protrudes beyond the first side surface of the central web and beyond a second side surface of the central web, the second side surface being situated opposite to the first side surface; and
- the third connecting conductor track extends on a first side, which is defined by the first side surface of the central web, of the transverse member on the first surface of the transverse web; and
- on a second side, which is defined by the second side surface of the central web, of the transverse member on the first surface of the transverse web.

10. The lightweight structure of claim 1, comprising a further carbon fiber structural battery comprising:
- a further cathode layer;
- a further first collector connected to the further cathode layer;
- a further anode layer;
- a further second collector connected to the further anode layer; and
- a further separator layer between the further anode layer and the further cathode layer;
- wherein the further carbon fiber structural battery is connected to the central web of the transverse member in an areal manner;
- wherein the second connecting conductor track extends on the second surface of the transverse web, ends in the region of the first end portion of the transverse member on the second surface of the transverse web, and is in contact with a second collecting conductor track, which is provided on the contact surface of the base web, is electrically insulated from the first collecting conductor track, and comprises an electrically conducting material,
- wherein the transverse web of the transverse member has a third connecting conductor track that comprises an electrically conducting material, extends in the first end portion on the first surface of the transverse web, ends on the second surface of the transverse web, and is in contact with the first collecting conductor track;
- wherein the transverse web of the transverse member has a fourth connecting conductor track that comprises an electrically conducting material, extends spaced apart from the third connecting conductor track on the first surface of the transverse web, ends in the region of the first end portion of the transverse member on the second surface of the transverse web, and is in contact with the second collecting conductor track;
- wherein the further first collector of the further carbon fiber structural battery is electrically connected to the third connecting conductor track; and
- wherein the further second collector of the further carbon fiber structural battery is electrically connected to the fourth connecting conductor track.

11. The lightweight structure of claim 1, comprising a second longitudinal member, which extends spaced apart from and along the first longitudinal member;
   wherein the transverse member is connected to the second longitudinal member at a second end portion, which is situated opposite to the first end portion.

12. An aircraft comprising the lightweight structure of claim 1.

13. The aircraft of claim 12, wherein the first longitudinal member extends in a longitudinal direction of a wing of the aircraft and forms a longitudinal spar; and
   the transverse member extends in a chord direction of the wing of the aircraft and forms a rib of the wing.

14. The lightweight structure of claim 1, wherein the central web, the transverse web, and the further transverse web define an H-shaped cross section of the transverse member.

15. The lightweight structure of claim 1, wherein the central web, the transverse web, and the further transverse web define a Z-shaped cross section of the transverse member.

16. The lightweight structure of claim 1, wherein the central web, the transverse web, and the further transverse web define a U-shaped cross section of the transverse member.

* * * * *